(12) United States Patent
Gass et al.

(10) Patent No.: US 6,880,440 B2
(45) Date of Patent: Apr. 19, 2005

(54) MITER SAW WITH IMPROVED SAFETY SYSTEM

(75) Inventors: Stephen F. Gass, Wilsonville, OR (US); David A. Fanning, Vancouver, WA (US)

(73) Assignee: SD3, LLC, Wilsonville, OR (US)

( * ) Notice: Subject to any disclaimer, the term of this patent is extended or adjusted under 35 U.S.C. 154(b) by 308 days.

(21) Appl. No.: 10/052,806

(22) Filed: Jan. 16, 2002

(65) Prior Publication Data

US 2002/0059855 A1 May 23, 2002

Related U.S. Application Data

(63) Continuation-in-part of application No. 09/676,190, filed on Sep. 29, 2000, and a continuation-in-part of application No. 09/929,221, filed on Aug. 13, 2001, and a continuation-in-part of application No. 09/929,226, filed on Aug. 13, 2001, and a continuation-in-part of application No. 09/929,227, filed on Aug. 13, 2001, and a continuation-in-part of application No. 09/929,234, filed on Aug. 13, 2001, and a continuation-in-part of application No. 09/929,235, filed on Aug. 13, 2001, and a continuation-in-part of application No. 09/929,236, filed on Aug. 13, 2001, and a continuation-in-part of application No. 09/929,237, filed on Aug. 13, 2001, and a continuation-in-part of application No. 09/929,238, filed on Aug. 13, 2001, and a continuation-in-part of application No. 09/929,240, filed on Aug. 13, 2001, and a continuation-in-part of application No. 09/929,241, filed on Aug. 13, 2001, and a continuation-in-part of application No. 09/929,242, filed on Aug. 13, 2001, and a continuation-in-part of application No. 09/929,244, filed on Aug. 13, 2001, and a continuation-in-part of application No. 09/929,425, filed on Aug. 13, 2001, and a continuation-in-part of application No. 09/929,426, filed on Aug. 13, 2001.

(60) Provisional application No. 60/270,011, filed on Feb. 20, 2001, provisional application No. 60/270,941, filed on Feb. 22, 2001, and provisional application No. 60/270,942, filed on Feb. 22, 2001.

(51) Int. Cl.$^7$ ............................ B26D 5/00; B26D 1/14; B27B 5/18

(52) U.S. Cl. ........................ 83/62.1; 83/58; 83/DIG. 1; 83/471.3; 83/477.1; 83/490; 83/589; 83/581; 192/129 R; 192/138; 337/10; 74/814; 307/326; 340/590

(58) Field of Search ................................ 83/397, 397.1, 83/471.2, 471.3, 473, 477, 477.1, 490, DIG. 1, 485, 585, 581, 491, 58, 62.1; 144/154.5, 356, 384, 391, 427, 286.6; 337/1, 10, 5, 17, 70, 140, 145, 170; 403/2; 74/2, 814; 173/2; 30/382, 381; 307/142, 115, 117, 126, 131, 326; 192/129 R, 133, 148, 144, 137, 138, 142 R; 340/680, 590, 562, 696.5; 361/1, 124; 318/362

(56) References Cited

U.S. PATENT DOCUMENTS

941,726 A 11/1909 Pfalzgraf (Continued)

FOREIGN PATENT DOCUMENTS

CH 297525 6/1954

(Continued)

OTHER PUBLICATIONS

Gordon Engineering Corp., Product Catalog, Oct. 1997, pp. cover, 1,3 and back, Brookfield, Connecticut, US.
*You Should Have Invented It*, French television show video.

*Primary Examiner*—Boyer D. Ashley

(57) ABSTRACT

A miter saw having a base and an arm that pivots toward the base is disclosed. A blade is supported by the arm, and is designed to cut workpieces resting on the base when the arm and blade pivot downward. The saw includes a detection system configured to detect one or more dangerous conditions between a person and the blade, such as when a person accidentally touches the spinning blade, and the saw includes a reaction system to stop the downward movement of the blade and arm when the dangerous condition is detected.

12 Claims, 9 Drawing Sheets

U.S. PATENT DOCUMENTS

| | | |
|---|---|---|
| 1,205,246 A | 11/1916 | Mowry |
| 1,551,900 A | 9/1925 | Morrow |
| 1,807,120 A | 5/1931 | Lewis |
| 1,896,924 A | 2/1933 | Ulrich |
| 1,902,270 A | 3/1933 | Tate |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 2,007,887 A | 7/1935 | Tautz |
| 2,020,222 A | 11/1935 | Tautz |
| 2,038,810 A | 4/1936 | Tautz |
| 2,106,288 A | 1/1938 | Tautz |
| 2,163,320 A | 6/1939 | Hammond |
| 2,241,556 A | 5/1941 | MacMillin et al. |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,425,331 A | 8/1947 | Kramer |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechimann |
| 2,572,326 A | 10/1951 | Evans |
| 2,593,596 A | 4/1952 | Olson |
| 2,623,555 A | 12/1952 | Eschenburg |
| 2,675,707 A | 4/1954 | Brown |
| 2,690,084 A | 9/1954 | Van Dam |
| 2,722,246 A | 11/1955 | Arnoldy |
| 2,731,049 A | 1/1956 | Akin |
| 2,736,348 A | 2/1956 | Nelson |
| 2,786,496 A | 3/1957 | Eschenburg |
| 2,954,118 A | 9/1960 | Anderson |
| 2,978,084 A | 4/1961 | Vilkaitis |
| 3,011,610 A | 12/1961 | Stiebel et al. |
| 3,047,116 A | 7/1962 | Stiebel et al. |
| 3,129,731 A | 4/1964 | Tyrell |
| 3,163,732 A | 12/1964 | Abbott |
| 3,186,256 A | 6/1965 | Reznick |
| 3,207,273 A | 9/1965 | Jurin |
| 3,323,814 A | 6/1967 | Phillips |
| 3,386,322 A | 6/1968 | Stone et al. |
| 3,454,286 A | 7/1969 | Anderson et al. |
| 3,540,338 A | 11/1970 | McEwan et al. |
| 3,554,067 A | 1/1971 | Scutella |
| 3,581,784 A | 6/1971 | Warrick |
| 3,613,748 A | 10/1971 | De Pue |
| 3,675,444 A | 7/1972 | Whipple |
| 3,680,609 A | 8/1972 | Menge |
| 3,695,116 A | 10/1972 | Baur |
| 3,785,230 A | 1/1974 | Lokey |
| 3,829,850 A | 8/1974 | Guetersloh |
| 3,858,095 A | 12/1974 | Friemann et al. |
| 3,861,016 A | 1/1975 | Johnson et al. |
| 3,922,785 A | 12/1975 | Fushiya |
| 3,931,727 A | 1/1976 | Luenser |
| 3,946,631 A | 3/1976 | Malm |
| 3,947,734 A | 3/1976 | Fyler |
| 3,953,770 A | 4/1976 | Hayashi |
| 3,967,161 A | 6/1976 | Lichtblau |
| 4,007,679 A | 2/1977 | Edwards |
| 4,026,177 A | 5/1977 | Lokey |
| 4,047,156 A | 9/1977 | Atkins |
| 4,060,160 A | 11/1977 | Lieber |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,117,752 A | 10/1978 | Yoneda |
| 4,145,940 A | 3/1979 | Woloveke et al. |
| 4,152,833 A | 5/1979 | Phillips |
| 4,161,649 A | 7/1979 | Klos et al. |
| 4,190,000 A | 2/1980 | Shaull et al. |
| 4,195,722 A | 4/1980 | Anderson et al. |
| 4,249,117 A | 2/1981 | Leukhardt et al. |
| 4,249,442 A | 2/1981 | Fittery |
| 4,267,914 A | 5/1981 | Saar |
| 4,270,427 A | 6/1981 | Colberg et al. |
| 4,276,799 A | 7/1981 | Muehling |
| 4,305,442 A | 12/1981 | Currie |
| 4,321,841 A | 3/1982 | Felix |
| 4,372,202 A | 2/1983 | Cameron |
| 4,391,358 A | 7/1983 | Haeger |
| 4,466,233 A | 8/1984 | Thesman |
| 4,470,046 A | 9/1984 | Betsill |
| 4,510,489 A | 4/1985 | Anderson, III et al. |
| 4,512,224 A * | 4/1985 | Terauchi ..................... 82/48 |
| 4,518,043 A | 5/1985 | Anderson et al. |
| 4,532,501 A | 7/1985 | Hoffman |
| 4,532,844 A | 8/1985 | Chang et al. |
| 4,560,033 A | 12/1985 | DeWoody et al. |
| 4,566,512 A | 1/1986 | Wilson |
| 4,573,556 A | 3/1986 | Andreasson |
| 4,599,597 A | 7/1986 | Rotbart |
| 4,599,927 A | 7/1986 | Eccardt et al. |
| 4,621,300 A | 11/1986 | Summerer |
| 4,637,188 A | 1/1987 | Crothers |
| 4,637,289 A | 1/1987 | Ramsden |
| 4,722,021 A | 1/1988 | Hornung et al. |
| 4,751,603 A | 6/1988 | Kwan |
| 4,757,881 A | 7/1988 | Jonsson et al. |
| 4,792,965 A | 12/1988 | Morgan |
| 4,805,504 A | 2/1989 | Fushiya et al. |
| 4,840,135 A | 6/1989 | Yamauchi |
| 4,906,962 A | 3/1990 | Duimstra |
| 4,934,233 A | 6/1990 | Brundage et al. |
| 4,937,554 A | 6/1990 | Herman |
| 4,965,909 A | 10/1990 | McCullough et al. |
| 5,020,406 A | 6/1991 | Sasaki et al. |
| 5,025,175 A | 6/1991 | Dubois, III |
| 5,046,426 A | 9/1991 | Julien et al. |
| 5,052,255 A | 10/1991 | Gaines |
| 5,081,406 A | 1/1992 | Hughes et al. |
| 5,082,316 A | 1/1992 | Wardlaw |
| 5,086,890 A | 2/1992 | Turczyn et al. |
| 5,122,091 A | 6/1992 | Townsend |
| 5,184,534 A | 2/1993 | Lee |
| 5,198,702 A | 3/1993 | McCullough et al. |
| 5,199,343 A | 4/1993 | OBanion |
| 5,201,684 A | 4/1993 | DeBois, III |
| 5,207,253 A | 5/1993 | Hoshino et al. |
| 5,212,621 A | 5/1993 | Panter |
| 5,218,189 A | 6/1993 | Hutchison |
| 5,245,879 A | 9/1993 | McKeon |
| 5,257,570 A | 11/1993 | Shiotani et al. |
| 5,265,510 A | 11/1993 | Hoyer-Ellefsen |
| 5,272,946 A | 12/1993 | McCullough et al. |
| 5,276,431 A | 1/1994 | Piccoli et al. |
| 5,285,708 A * | 2/1994 | Bosten et al. ................. 83/520 |
| 5,331,875 A | 7/1994 | Mayfield |
| 5,377,554 A | 1/1995 | Reulein et al. |
| 5,377,571 A | 1/1995 | Josephs |
| 5,392,678 A * | 2/1995 | Sasaki et al. .............. 83/471.3 |
| 5,510,685 A | 4/1996 | Grasselli |
| 5,534,836 A | 7/1996 | Schenkel et al. |
| 5,606,889 A | 3/1997 | Bielinski et al. |
| 5,667,152 A | 9/1997 | Mooring |
| 5,671,633 A | 9/1997 | Wagner |

| | | | | | | |
|---|---|---|---|---|---|---|
| 5,695,306 A | 12/1997 | Nygren, Jr. | 6,644,157 B1 | 11/2003 | Huang | |
| 5,724,875 A | 3/1998 | Meredith et al. | 6,647,847 B1 | 11/2003 | Hewitt et al. | |
| 5,730,165 A | 3/1998 | Philipp | 2002/0017175 A1 * | 2/2002 | Gass et al. | 83/13 |
| 5,755,148 A * | 5/1998 | Stumpf et al. ............. 83/468.2 | 2002/0017176 A1 | 2/2002 | Gass et al. | |
| 5,771,742 A | 6/1998 | Bokaie et al. | 2002/0017178 A1 | 2/2002 | Gass et al. | |
| 5,782,001 A | 7/1998 | Gray | 2002/0017179 A1 * | 2/2002 | Gass et al. | 83/58 |
| 5,787,779 A | 8/1998 | Garuglieri | 2002/0017180 A1 | 2/2002 | Gass et al. | |
| 5,791,057 A | 8/1998 | Nakamura et al. | 2002/0017181 A1 * | 2/2002 | Gass et al. | 83/58 |
| 5,791,223 A | 8/1998 | Lanzer | 2002/0017182 A1 | 2/2002 | Gass et al. | |
| 5,791,224 A | 8/1998 | Suzuki et al. | 2002/0017183 A1 | 2/2002 | Gass et al. | |
| 5,861,809 A | 1/1999 | Eckstein et al. | 2002/0017184 A1 | 2/2002 | Gass et al. | |
| 5,921,367 A | 7/1999 | Kashioka et al. | 2002/0017336 A1 | 2/2002 | Gass et al. | |
| 5,937,720 A | 8/1999 | Itzov | 2002/0020261 A1 | 2/2002 | Gass et al. | |
| 5,942,975 A | 8/1999 | Sorensen | 2002/0020262 A1 | 2/2002 | Gass et al. | |
| 5,950,514 A | 9/1999 | Benedict et al. | 2002/0020263 A1 | 2/2002 | Gass et al. | |
| 5,963,173 A | 10/1999 | Lian et al. | 2002/0020265 A1 | 2/2002 | Gass et al. | |
| 6,018,284 A | 1/2000 | Rival et al. | 2002/0020271 A1 | 2/2002 | Gass et al. | |
| 6,052,884 A | 4/2000 | Steckler et al. | 2002/0056348 A1 * | 5/2002 | Gass et al. | 83/62.1 |
| 6,095,092 A | 8/2000 | Chou | 2002/0056349 A1 * | 5/2002 | Gass et al. | 83/62.1 |
| 6,119,984 A | 9/2000 | Devine | 2002/0056350 A1 | 5/2002 | Gass et al. | |
| 6,133,818 A | 10/2000 | Hsieh et al. | 2002/0059853 A1 * | 5/2002 | Gass et al. | 83/62 |
| 6,148,504 A | 11/2000 | Schmidt et al. | 2002/0059854 A1 * | 5/2002 | Gass et al. | 83/62 |
| 6,244,149 B1 | 6/2001 | Ceroll et al. | 2002/0066346 A1 * | 6/2002 | Gass et al. | 83/58 |
| 6,257,061 B1 | 7/2001 | Nonoyama et al. | 2002/0069734 A1 | 6/2002 | Gass et al. | |
| 6,366,099 B1 | 4/2002 | Reddi | 2002/0109036 A1 | 8/2002 | Denen et al. | |
| 6,404,098 B1 | 6/2002 | Kayama et al. | 2002/0170399 A1 * | 11/2002 | Gass et al. | 83/62.1 |
| 6,418,829 B1 | 7/2002 | Pilchowski | 2003/0074873 A1 | 4/2003 | Freiberg et al. | |
| 6,420,814 B1 | 7/2002 | Bobbio | 2003/0089212 A1 | 5/2003 | Parks et al. | |
| 6,430,007 B1 | 8/2002 | Jabbari | 2003/0109798 A1 | 6/2003 | Kermani | |
| 6,450,077 B1 | 9/2002 | Ceroll et al. | | | | |
| 6,453,786 B1 | 9/2002 | Ceroll et al. | | | | |

FOREIGN PATENT DOCUMENTS

| | | |
|---|---|---|
| 6,460,442 B1 | 10/2002 | Talesky et al. |
| 6,479,958 B1 | 11/2002 | Thompson et al. |

| | | |
|---|---|---|
| DE | 76186 | 8/1921 |
| DE | 2800403 | 7/1979 |
| DE | 3427733 | 1/1986 |
| DE | 4235161 A1 | 5/1993 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 2096844 | 10/1982 |
| GB | 2142571 | 1/1985 |
| WO | WO 01/26064 A2 | 4/2001 |

| | | |
|---|---|---|
| D466,913 S | 12/2002 | Ceroll et al. |
| D469,354 S | 1/2003 | Curtsinger |
| 6,543,324 B1 | 4/2003 | Dils |
| 6,546,835 B1 | 4/2003 | Wang |
| 6,575,067 B1 | 6/2003 | Parks et al. |
| 6,578,856 B1 | 6/2003 | Kahle |
| 6,595,096 B1 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,619,348 B1 | 9/2003 | Wang |
| 6,640,683 B1 | 11/2003 | Lee |

* cited by examiner

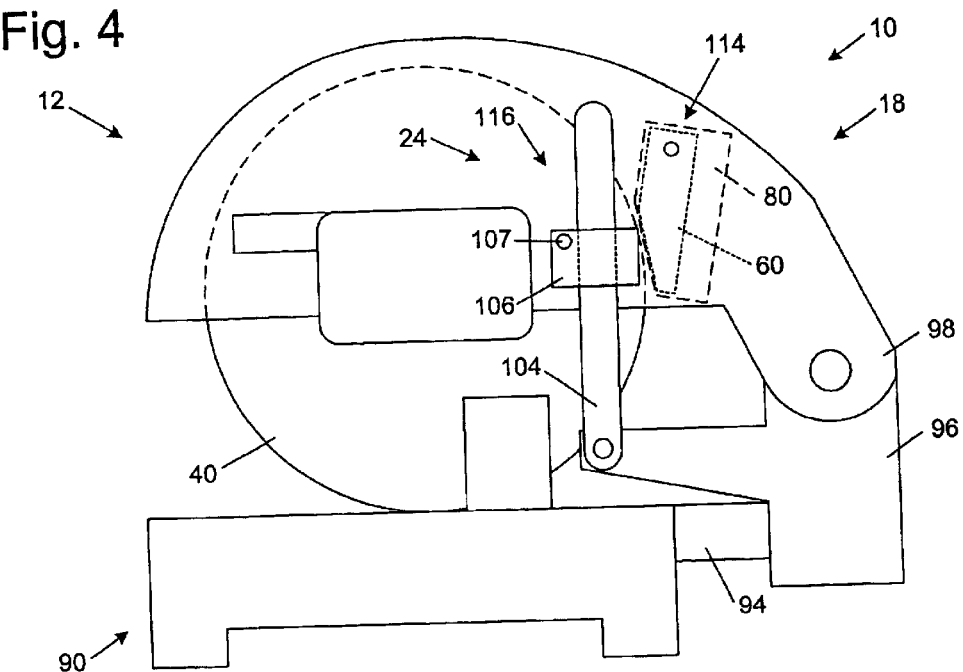
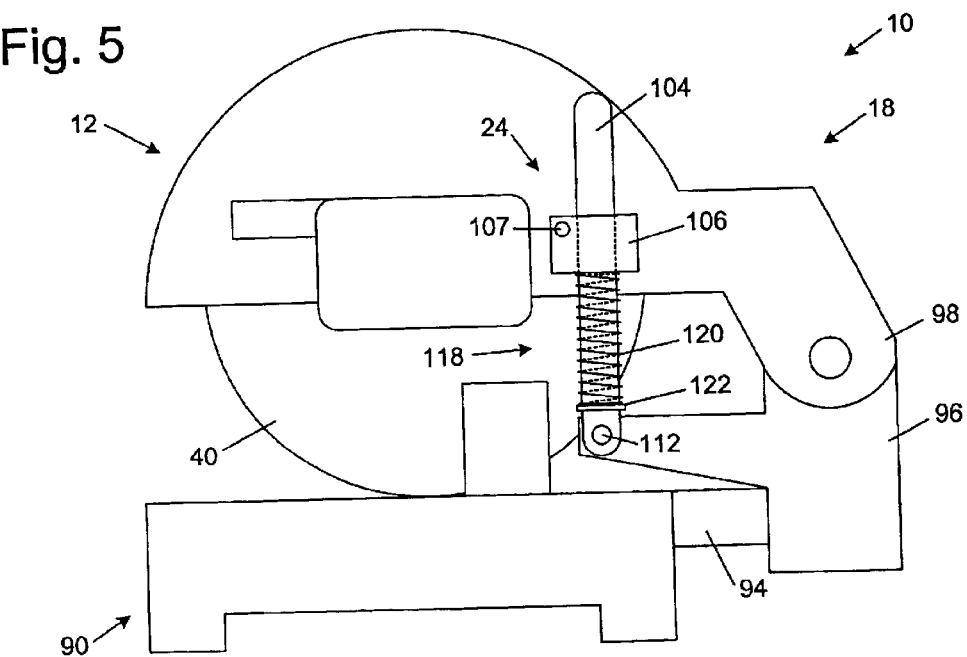

MITER SAW WITH IMPROVED SAFETY SYSTEM

CROSS-REFERENCE TO RELATED APPLICATIONS

This application is a continuation-in-part of the following U.S. patent applications, all of which are hereby incorporated by reference: Ser. No. 09/676,190, filed Sep. 29, 2000, Ser. No. 09/929,221, filed Aug. 13, 2001, Ser. No. 09/929,226, filed Aug. 13, 2001, Ser. No. 09/929,227, filed Aug. 13, 2001, Ser. No. 09/929,234, filed Aug. 13, 2001, Ser. No. 09/929,235, filed Aug. 13, 2001, Ser. No. 09/929,236, filed Aug. 13, 2001, Ser. No. 09/929,237, filed Aug. 13, 2001, Ser. No. 09/929,238, filed Aug. 13, 2001, Ser. No. 09/929,240, filed Aug. 13, 2001, Ser. No. 09/929,241, filed Aug. 13, 2001, Ser. No. 09/929,242, filed Aug. 13, 2001, Ser. No. 09/929,244, filed Aug. 13, 2001, Ser. No. 09/929,425, filed Aug. 13, 2001, and Ser. No. 09/929,426, filed Aug. 13, 2001.

This application claims the benefit of and priority from the following U.S. Provisional Patent Applications, all of which are hereby incorporated by reference: Ser. No. 60/270,011, filed Feb. 20, 2001, Ser. No. 60/270,941, filed Feb. 22, 2001 and Ser. No. 60/270,942, filed Feb. 22, 2001.

FIELD OF THE INVENTION

The present invention relates to miter saws, and more particularly to a miter saw with a high-speed safety system.

BACKGROUND AND SUMMARY OF THE INVENTION

Miter saws are a type of woodworking machinery used to cut workpieces of wood, plastic and other materials. Miter saws typically include a base upon which workpieces are placed and include a circular saw blade mounted on a pivot arm. A person uses a miter saw by placing a workpiece on the base beneath the upraised blade and then bringing the blade down via the pivot arm to cut the workpiece. Miter saws present a risk of injury to users because the spinning blade is often exposed when in use. Furthermore, users often use their hands to position and support workpieces beneath the blade, which increases the chance that an injury will occur.

The present invention provides a miter saw with an improved safety system that is adapted to detect the occurrence of one or more dangerous, or triggering, conditions during use of the miter saw, such as when a user's body contacts the spinning saw blade. When such a condition occurs, the safety system is actuated to limit or even prevent injury to the user.

BRIEF DESCRIPTION OF THE DRAWINGS

FIG. 4 is a schematic side elevation view of a miter saw with an alternative exemplary safety system configured to stop the blade and the pivot arm.

FIG. 5 is a schematic side elevation view of a miter saw with an alternative exemplary safety system configured to stop the pivot arm.

DETAILED DESCRIPTION AND BEST MODE OF THE INVENTION

Figure 1:
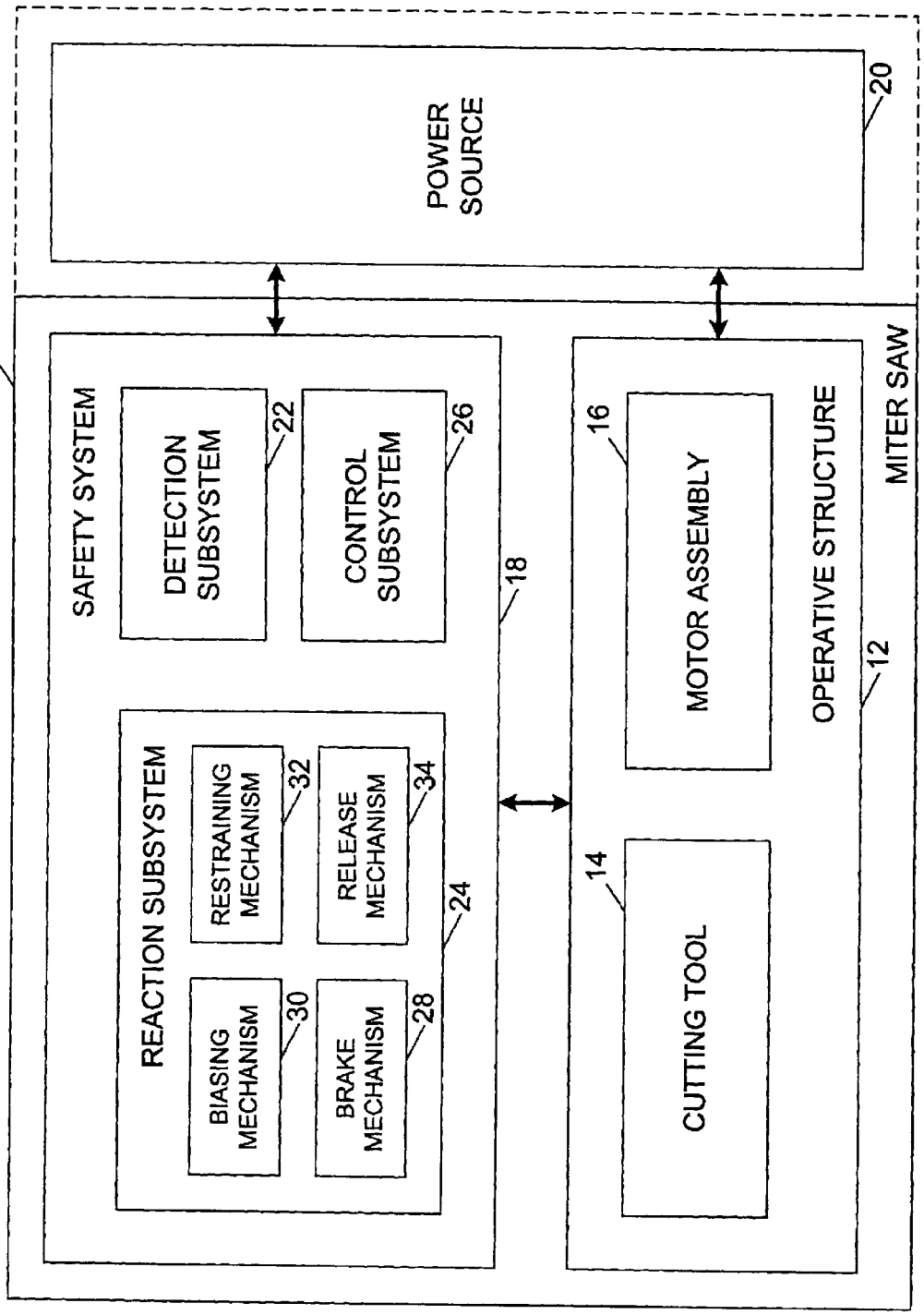
FIG. 1 is a schematic block diagram of a miter saw with a fast-acting safety system according to the present invention.

A miter saw according to the present invention is shown schematically in FIG. 1 and indicated generally at 10. Miter saw 10 may be any of a variety of different types and configurations of miter saw adapted for cutting workpieces, such as wood, plastic, etc. Miter saw 10 includes an operative structure 12 having a cutting tool 14 and a motor assembly 16 adapted to drive the cutting tool. Miter saw 10 also includes a safety system 18 configured to minimize the potential of a serious injury to a person using miter saw 10. Safety system 18 is adapted to detect the occurrence of one or more dangerous, or triggering, conditions during use of miter saw 10. If such a dangerous condition is detected, safety system 18 is adapted to engage operative structure 12 to limit any injury to the user caused by the dangerous condition.

Miter saw 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of miter saw 10.

It will be appreciated that operative structure 12 may take any one of many different forms, depending on the type of miter saw 10. As will be described in more detail below, operative structure 12 typically takes the form of an arm pivotally coupled to a base. Cutting tool 14 is mounted on the arm and pivotal toward a workpiece supported by the base. Alternatively, the arm may be both pivotally and slidably coupled to the base.

Motor assembly 16 includes one or more motors adapted to drive cutting tool 14. The motors may be either directly or indirectly coupled to the cutting tool. Typically, motor assembly 16 is mounted on the pivot arm and directly coupled to the cutting tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of miter saw 10. In addition, control subsystem 26 typically includes one or more instruments operable by a user to control the miter saw. The control subsystem is configured to control miter saw 10 in response to the inputs it receives.

Detection subsystem 22 is configured to detect one or more dangerous, or triggering, conditions during use of miter saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S. patent application Ser. No. 09/676,190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of miter saw 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of miter saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
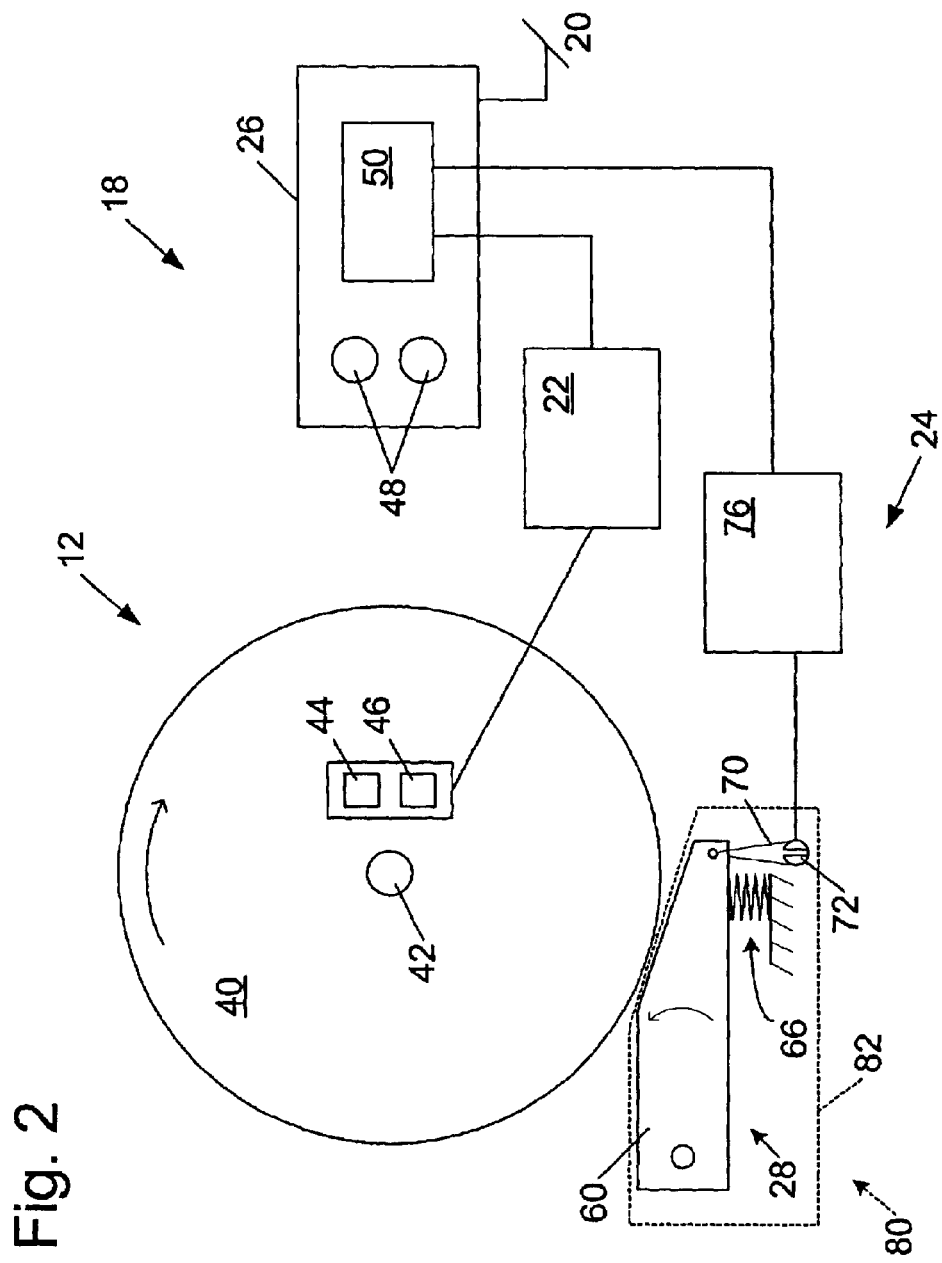
FIG. 2 is a schematic diagram of an exemplary safety system configured to stop the miter saw blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of miter saw 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of miter saw 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000 and U.S. patent application Ser. No. 09/929,221, filed Aug. 13, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,170, filed Aug. 14, 2000, U.S. patent application Ser. No. 09/929,227, filed Aug. 13, 2001, U.S. Provisional Patent Application Ser. No. 60/225,169, filed Aug. 14, 2000 and U.S. patent application Ser. No. 09/929,241, filed Aug. 13, 2001, the disclosures of which are herein incorporated by reference.

It will be appreciated that activation of the brake mechanism will typically require the replacement of one or more portions of safety system 18. For example, pawl 60 and fusible member 70 typically must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/929,236, filed Aug. 13, 2001, U.S. Provisional Patent Application Ser. No. 60/225,212, filed Aug. 14, 2000 and U.S. patent application Ser. No. 09/929,244, filed Aug. 13, 2001, the disclosures of which are herein incorporated by reference.

In the exemplary embodiment illustrated in FIG. 2, reaction subsystem 24 is configured to act on cutting tool 14 and stop the rotation of blade 40. As mentioned above, reaction subsystem 24 additionally or alternatively may be configured to act on a different portion of operative structure 12 to stop and/or reverse the translation of blade 40 toward the workpiece and the user's body.

Figure 3:
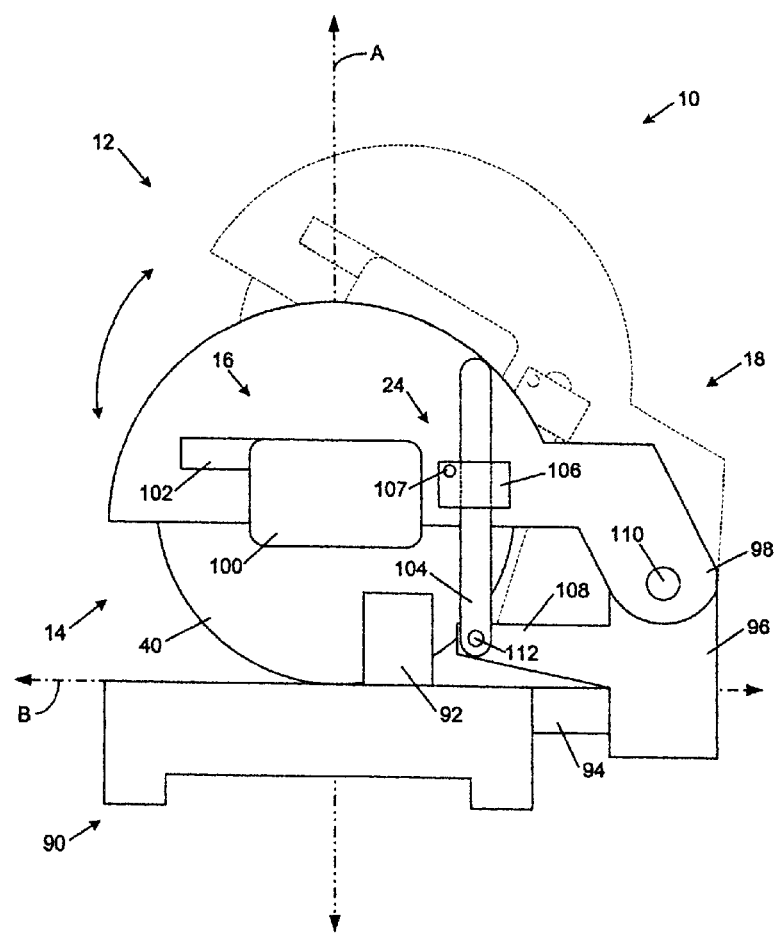
FIG. 3 is a schematic side elevation view of a miter saw having an alternative exemplary safety system configured to stop the miter saw pivot arm.

For example, FIG. 3 provides a schematic illustration of a different exemplary embodiment of miter saw 10 in which reaction subsystem 24 is configured to stop the downward pivoting movement of operative structure 12. Exemplary miter saw 10 includes a base assembly 90 adapted to support a workpiece during cutting. Typically, one or more fences 92 are mounted on base assembly 90 and adapted to prevent workpieces from shifting across the base assembly during cutting.

Operative structure 12 is coupled to base assembly 90 and includes a platen 94, a tilt mechanism 96, and a pivot arm 98. Platen 94 is coupled to base assembly 90 and rotatable, relative to the base assembly, about the axis indicated at A. Tilt mechanism 96 is coupled to platen 94. At least a portion of the tilt mechanism is rotatable, relative to base assembly 90, about the axis indicated at B. Pivot arm 98 is coupled to tilt mechanism 96 and selectively pivotal toward and away from base assembly 90, as illustrated in FIG. 3. Typically, the pivot arm is biased upward away from base assembly 90 by a spring or other suitable mechanism.

Motor assembly 16 is mounted on pivot arm 98 and includes at least one motor 100 and a control handle 102. Blade 40 is coupled to an arbor shaft (not shown) that is rotatably driven by motor 100. Control handle 102 includes one or more controls (not shown) that are operable by a user to control motor 100. A user brings blade 40 into contact with a workpiece by grasping handle 102 and pulling pivot arm 98 downward against the upward bias from a nominal position (indicated generally by dash lines in FIG. 3), toward base assembly 90. Once the cutting operation is completed, the user allows the pivot arm to pivot upward toward the nominal position.

It will be appreciated by those of skill in the art that the miter saw configuration depicted in FIG. 3 and described above is one commonly referred to as a "compound miter saw," which allows a user to make a compound (i.e., both mitered and beveled) cut in a workpiece by adjusting the position of platen 94 and/or tilt mechanism 96. However, there are many other miter saw configurations known to those of skill in the art which are also suitable for use with the present invention. Thus, it will be understood that the particular miter saw configurations depicted and described herein are provided to illustrate exemplary embodiments of the invention, and should not be interpreted to limit the scope or application of the present invention.

Although not shown in FIG. 3, detection subsystem 22 and control subsystem 26 may be mounted at any desired location on miter saw 10 and configured to detect contact between blade 40 and a user's body as described above and in the references incorporated herein. Upon receiving an activation signal, reaction subsystem 24 is configured to stop the movement of pivot arm 98 toward base assembly 90 quickly enough to prevent serious injury to the user. Preferably, the reaction subsystem ensures that the pivot arm travels no more than $\frac{1}{8}$-inch toward base assembly 90 after the user's body contacts the blade. Assuming an upper pivot speed of 1-foot per second, the reaction subsystem is configured to stop the pivot arm within approximately 10-milliseconds. More preferably, reaction subsystem 24 stops pivot arm 98 within approximately 5-milliseconds to limit the downward travel of the pivot arm 1/16-inch or less after contact between the user and the blade.

It will be appreciated that reaction subsystem 24 may be configured to stop the downward movement of pivot arm 98 in a variety of different ways. In the exemplary embodiment, the reaction subsystem includes a brace member 104 and a locking assembly 106. Brace member 104 is coupled to tilt mechanism 96. Locking assembly 106 is pivotally coupled to pivot arm 98 at 107 and configured to slidably receive at least a portion of brace member 104. The locking assembly is configured to quickly and securely grip or lock onto the brace member upon receipt of an actuation signal from control subsystem 26. Pivot arm 98 is prevented from moving downward toward base assembly 90 when locking assembly 106 grips brace member 104. While reaction subsystem 24 is illustrated as having a single brace member and single locking assembly on one side of miter saw 10, it will be appreciated that the reaction subsystem may alternatively include a plurality of brace members and/or locking assemblies positioned at selected locations on miter saw 10.

Brace member 104 may take any of a variety of different forms. In the exemplary embodiment, the brace member is an elongate bar or shaft pivotally coupled to tilt mechanism 96. Brace member 104 may be constructed of any suitably rigid material such as steel, aluminum, plastic, ceramic, etc. The pivotal coupling between the brace member and the tilt mechanism allows the brace member to pivot as necessary to follow the locking assembly as the pivot arm moves toward and away from the base assembly.

In the exemplary embodiment, brace member 104 is coupled to an arm portion 108 of tilt mechanism 96 that extends outward from the tilt mechanism toward the base assembly. While arm portion 108 is depicted as an integral, unitary portion of the tilt mechanism, arm portion 108 may alternatively take the form of a separate bracket attached to the tilt mechanism. Alternatively, the arm may be omitted and brace member 104 may be coupled to another portion of the tilt mechanism. In any event, the brace member should be relatively rigidly supported to ensure that pivot arm 98 is prevented from downward movement when locking assembly 106 locks onto the brace member.

Locking assembly 106 may be coupled to pivot arm 98 in any of a variety of different places. Typically, the locking assembly is disposed to position brace member 104 spaced apart from pivot point 110 of arm 98 to increase the moment of the stopping force applied by reaction subsystem 24 to pivot arm 98. It will be appreciated that the further brace member 104 is positioned from pivot point 110, the greater the moment of force provided by the brace member. Thus, it is generally desirable, though not necessary, to position the brace member as close to the front of miter saw 10 (i.e., the left side as shown in FIG. 3) as possible without interfering with the use of the miter saw. Similarly, pivot point 112 of the brace member is disposed, relative to the locking assembly, to orient the brace member generally perpendicular to the direction in which the pivot arm moves. This arrangement ensures that the stopping force on the brace member is substantially a compression force rather than torque. Alternatively, locking assembly 106 and pivot point 112 may be disposed at any selected position suitable for stopping downward movement of pivot arm 98.

Since brace member 104 is coupled to tilt mechanism 96, the brace member will rotate along with pivot arm 98 about axis A when the miter saw is adjusted for mitered cuts. Similarly, the brace member will tilt about axis B when the miter saw is adjusted for beveled cuts. Thus, the exemplary configuration of reaction subsystem 24 depicted in FIG. 3 allows a user to adjust miter saw 10 throughout its full range of movement.

In the exemplary embodiments shown in FIGS. 2 and 3, reaction subsystem 24 is configured to stop the movement of blade 40 or pivot arm 98, respectively. However, it may be desirable in some applications to stop the movement of both the blade and the pivot arm to provide an increased level of protection for the user. For example, when the rotation of blade 40 is stopped suddenly, the angular momentum of the blade may be transferred to pivot arm 98, causing the pivot arm to move downward toward base assembly 90 and the user. Thus, it may be desirable to stop the movement of the pivot arm at substantially the same time the movement of the blade is stopped.

One exemplary embodiment in which reaction subsystem 24 is configured to stop the movement of both the blade and the pivot arm is indicated schematically in FIG. 4. The reaction subsystem includes a first portion 114 configured to stop the movement of blade 40. Exemplary first portion 114 includes a pawl 60 mounted within a cartridge 80. Further details of the pawl and cartridge, as well as alternative mechanisms for stopping blade 40, are described above and in U.S. Provisional Patent Application Ser. No. 60/225,169, filed Aug. 14, 2000 and U.S. patent application Ser. No. 09/929,241, filed Aug. 13, 2001, the disclosures of which are incorporated herein by reference. Reaction subsystem 24 also includes a second portion 116 configured to stop the downward movement of pivot arm 98. Exemplary second portion 116 includes a brace member 104 and a locking assembly 106, such as are described herein. Alternatively, second portion 116 may be any mechanism configured to stop the downward movement of the pivot arm in response to an activation signal. In any event, while various embodiments of safety system 18 are described herein as being configured to stop the movement either of blade 40 or of pivot arm 98, it will be appreciated that each of the exemplary embodiments may alternatively be configured to stop the movement of both blade 40 and pivot arm 98.

Turning attention now to FIG. 5, another alternative embodiment is illustrated. In this embodiment, reaction subsystem 24 includes a positioning mechanism 118 configured to eliminate any looseness or "play" in brace member 104 and/or locking assembly 106. This ensures that the downward movement of pivot arm 98 is stopped as soon as the locking assembly locks the brace member. Positioning mechanism 118 may be configured in any of a variety of different ways. In the exemplary embodiment, the positioning mechanism is in the form of a compression spring 120 disposed around brace member 104. Spring 120 abuts against a portion of the brace member and a portion of the locking assembly.

Brace member 104 includes a flange 122 or similar structure adapted to contact spring 120. Spring 120 typically is sized to ensure that the spring is at least somewhat compressed between flange 122 and locking assembly 106 regardless of the position of pivot arm 98. As a result, the spring maintains a constant force on the brace member toward pivot point 112. Pivot point 112 usually takes the form of a pin or similar structure configured to pivotally couple the brace member to the tilt mechanism. Spring 120 ensures that the brace member is continuously urged downward against the upper surface of the pin so that the brace member does not shift downward when the locking assembly locks onto the brace member. Similarly, spring 120 maintains a constant force on locking assembly 106 so that the locking assembly is continuously urged upward against its coupling to pivot arm 98 (the coupling of locking assembly 106 to pivot arm 98 will be described in more detail below). As a result, the locking assembly does not shift upward when it locks onto the brace member.

It will be appreciated that many different modifications and variations may be made to positioning mechanism 118. For example, spring 120 may be configured to abut against the brace member only or the locking assembly only. Additionally, spring 120 may be a different type of spring such as a tension spring, torsion spring, etc. As another example, the positioning mechanism may include separate sub-mechanisms, one configured to engage the brace member and another configured to engage the locking assembly. Thus, the invention is not limited to the particular embodiment shown, but includes all such modifications and variations. Although illustrated in the context of one particular miter saw configuration, it will be appreciated that positioning mechanism 118 may be adapted for use with all configurations of miter saw 10, as well as all configurations of brace member 104 and locking assembly 106.

In the exemplary embodiments depicted in FIGS. 3–5, brace member 104 is coupled to a portion of tilt mechanism 96. As discussed above, this arrangement allows pivot arm 98 to be moved throughout its full range of adjustment relative to base assembly 90, and ensures that reaction subsystem 24 does not interfere with the normal use of miter saw 10. However, there are many alternative configurations possible within the scope of the invention in which the brace member is coupled to a portion of miter saw 10 other than the tilt mechanism.

Figure 6:
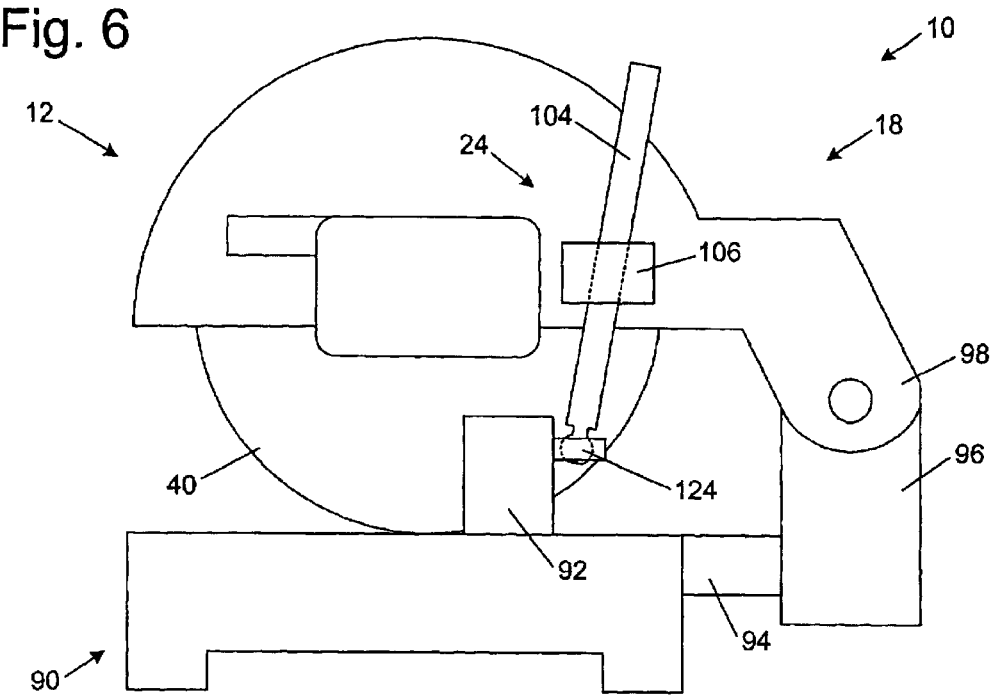
FIG. 6 is a schematic side elevation view of a miter saw with an alternative exemplary safety system configured to stop the pivot arm.

For example, FIG. 6 illustrates an alternative embodiment in which brace member 104 is coupled to fence 92. Since fence 92 does not rotate, tilt, or pivot with pivot arm 98, the coupling between the brace member and the fence is adapted to allow the brace member to move as necessary to follow the pivot arm throughout the full range of movement of the pivot arm. In the exemplary embodiment depicted in FIG. 6, brace member 104 is coupled to fence 92 by a ball-joint-rod-end-bearing coupling 124, allowing the brace arm to rotate, tilt and pivot along with the pivot arm. Suitable ball-joint-rod-end-bearings are available from a variety of sources including MSC Industrial Supply Company of Melville, N.Y. Alternatively, other types of couplings may be suitable, such as universal couplings, flexible couplings, etc. In any event, fence 92 is configured to support brace member 104 securely and absorb the force produced when the downward movement of pivot arm 98 is stopped by reaction subsystem 24.

Figure 7:
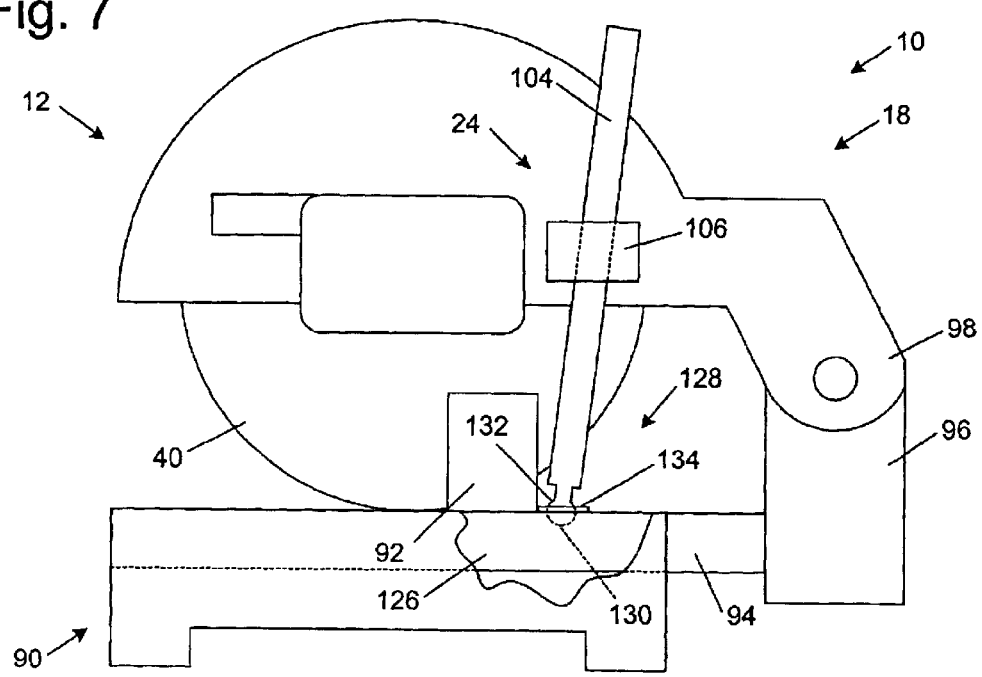
FIG. 7 is a schematic side elevation view of a miter saw with an alternative exemplary safety system configured to stop the pivot arm.

FIG. 7 illustrates another alternative embodiment in which brace member 104 is coupled to platen 94. The exemplary platen includes a generally circular portion 126 coupled to rotate relative to base assembly 90. The coupling between brace member 104 and circular portion 126 is adapted to allow the brace member to tilt and pivot along with pivot arm 98. In the exemplary embodiment, the brace member is coupled to the platen by a ball-and-socket coupling 128. The coupling includes a generally hemispherical socket 130 disposed in platen 94 and adapted to receive a ball-shaped portion 132 of brace member 104. Coupling 128 also includes a cap 134 disposed on platen 94 above socket 130 and adapted to fit over the brace member and retain ball-shaped portion 132 within the socket. Coupling 128 allows the brace member to pivot and/or tilt as necessary while the pivot arm is adjusted throughout its full range of movement. Alternatively, other types of couplings may be suitable, such as universal couplings, flexible couplings, etc. In any event, the force produced when pivot arm 98 is suddenly stopped is transferred through brace member 104 to platen 94.

Those of skill in the art will appreciate that the different embodiments depicted in FIGS. 3, 6 and 7 transfer the force produced by stopping the movement of pivot arm 98 onto different portions of miter saw 10. Each embodiment may offer different advantages depending on the structure and configuration of miter saw 10. In embodiments in which the brace member is coupled to the tilt mechanism (e.g. such as illustrated in FIG. 3), the coupling between the brace member and the tilt mechanism can be pivotal about a single axis. This may allow the use of simpler, less-expensive couplings. However, any flexibility in the coupling between the tilt mechanism and either the platen or the base assembly may allow the pivot arm to flex downward even though the locking assembly is securely locked to the brace member. Where such flexing is present and significant, those embodiments in which the brace member is coupled to the platen or the base assembly (e.g., such as illustrated in FIGS. 6 and 7) may be preferred since the brace member is supported directly by the platen or base assembly rather than indirectly through the tilt mechanism.

Figure 8:
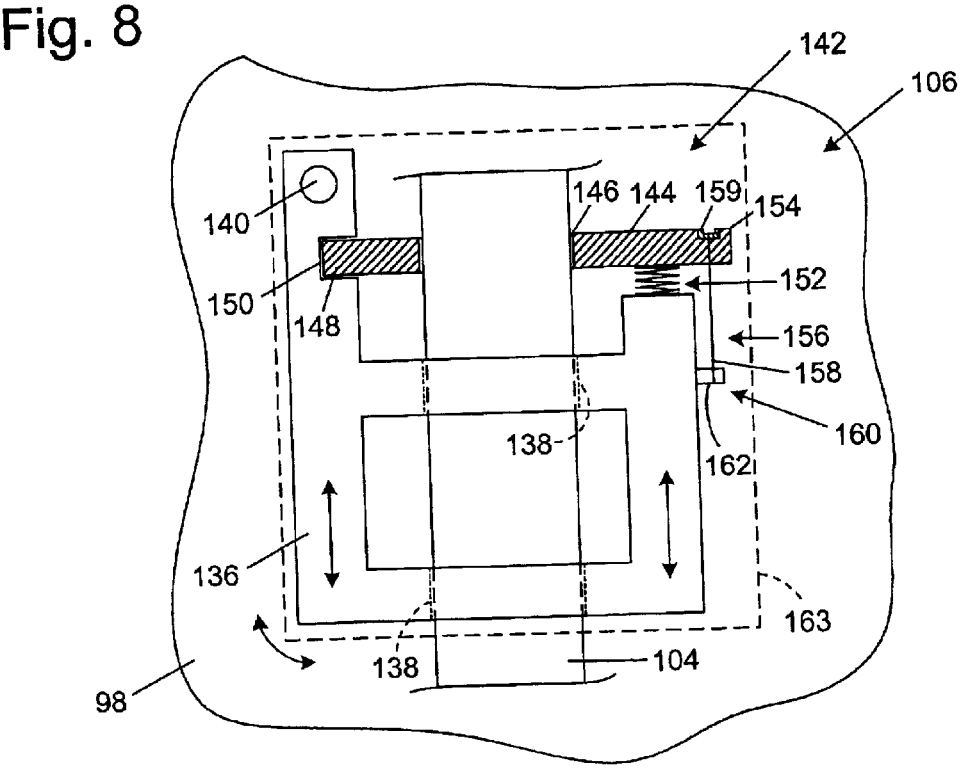
FIG. 8 is schematic, fragmentary view of an exemplary reaction subsystem adapted to stop the movement of the pivot arm.
Figure 9:
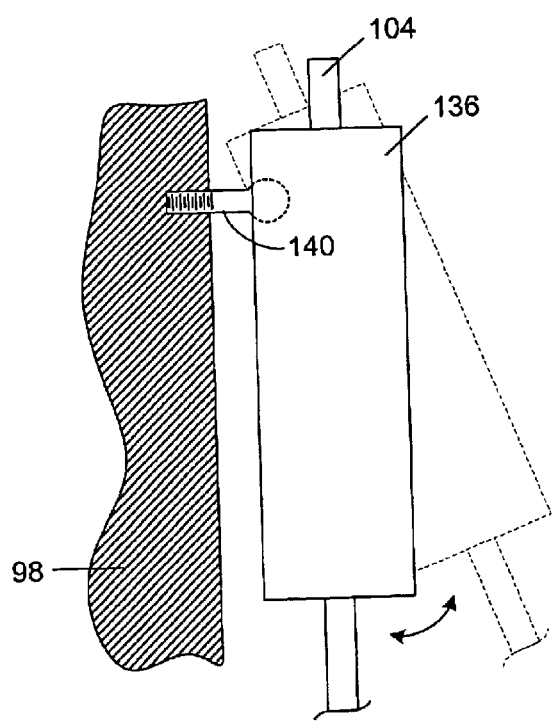
FIG. 9 is schematic, fragmentary view showing an exemplary coupling between the reaction subsystem and the pivot arm.
Figure 10:
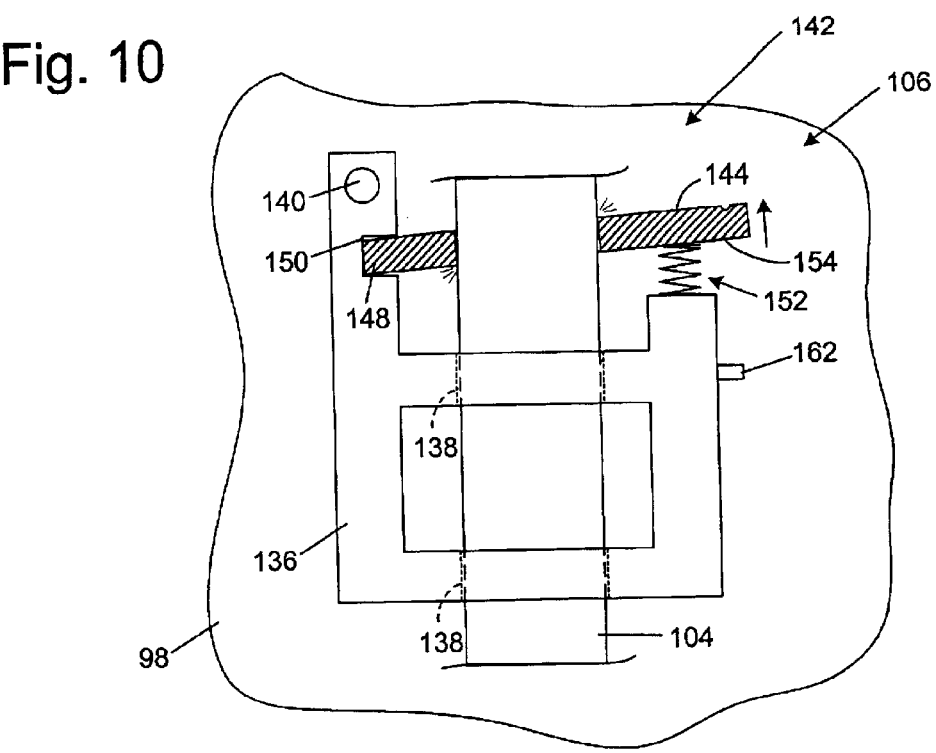
FIG. 10 is similar to FIG. 8 but shows the clamping device in the locked position to prevent movement of the pivot arm toward the base assembly.

Turning attention now to FIGS. 8–10, one exemplary embodiment of locking assembly 106 is illustrated. As discussed above, locking assembly 106 is configured to engage and lock onto brace member 104 to stop downward movement of pivot arm 98 in response to an activation signal from control subsystem 26. Exemplary locking assembly 106 includes a frame 136 configured to slidably receive brace member 104. Frame 136 includes one or more channels 138 adapted to fit around the brace member and maintain the frame in alignment with the brace member.

Frame 136 is connected to the side of pivot arm 98 by a coupling 140 that allows the frame to move relative to the pivot arm as needed. Any of a variety of different couplings may be used which are known to those of skill in the art, including the couplings described above for connecting the brace member to the fence or the platen. In embodiments where the brace member is coupled to tilt mechanism 96, coupling 140 is configured to allow the frame to pivot generally parallel to the side of the pivot arm. In embodiments where the brace member is connected to a different structure on miter saw 10 such as platen 94 or fence 92, coupling 140 is configured to allow the frame to both pivot parallel to the side of the pivot arm and tilt away from the pivot arm as illustrated in FIG. 9.

Locking assembly 106 also includes a gripping mechanism 142 configured to selectively engage and grip brace member 104. Gripping mechanism 142 may be any one or a combination of elements, devices or systems configured to quickly and securely grip the brace member. For example, the gripping mechanism may include a clamping device 144 adapted to selectively pivot into and bind against the brace member, such as illustrated in FIGS. 8 and 10. Exemplary clamping device 144 is formed to define an orifice 146 sized to fit around brace member 104. A proximal end 148 of the clamping device is pivotally coupled to frame 136. In the exemplary embodiment, proximal end 148 is received within a recessed portion 150 of the frame. The recessed portion is sized to allow the clamping device sufficient pivotal movement to bind against the brace member. Alternatively, any other pivotal coupling may be used.

Locking assembly 106 also includes a biasing mechanism 152 adapted to urge a distal end 154 of clamping device 144 from a nominal, unactuated or cocked position as shown in FIG. 8, toward a locked position as shown in FIG. 10. When in the nominal position, the clamping device is aligned so that orifice 146 slides relatively freely around the brace member. Thus, locking assembly 106 is configured to slide along the brace member when the clamping device is in the nominal position, thereby allowing the user to adjust and move pivot arm 98 as desired.

Conversely, when the clamping device is in the locked position, the sides of orifice 146 bind against the brace member to prevent the clamping device from sliding along the brace member in at least one direction. In the exemplary embodiment, distal end 154 of the clamping device is pivoted upward (as viewed in FIG. 10) relative to proximal end 148 until the sides of orifice 146 bind against the brace member. The angle through which the clamping device must pivot before binding against the brace member will vary based at least partially on the size differential between orifice 146 and brace member 104. The binding force generated by the clamping device against the brace member is expected to increase where the pivot angle between the nominal position and the locked position is relatively small. Therefore, orifice 146 typically is sized to fit relatively closely around the brace member. For example, in an embodiment where brace member 104 takes the form of a rod having a circular cross-section with a diameter of approximately 0.375-inch, one suitable diameter for orifice 146 would be approximately 0.376-inch. Alternatively, other diameters may also be used within the scope of the invention. For clarity, the size difference between orifice 146 and brace member 104 is shown substantially exaggerated in FIGS. 8 and 10.

When clamping device 144 is free to pivot toward the locked position, the constant upward force of biasing mechanism 152 ensures that the upper and lower edges of orifice 146 securely grip the brace member. The upper surface of proximal end 148 abuts against the top of recessed portion 150. As a result, any downward force on frame 136 relative to the brace member is translated into downward pressure on proximal end 148, thereby increasing the binding pressure of the clamping device on the brace member. Thus, when clamping device 144 pivots upward from its nominal position to its locked position, locking assembly 106 securely grips the brace member and is prevented from sliding further downward along the brace member. Since the locking assembly is coupled to pivot arm 98, the pivot arm is prevented from moving downward toward base assembly 90 when clamping device 144 is in its locked position.

Locking assembly 106 is configured to grip brace member 104 securely enough to overcome the downward force on pivot arm 98 caused by the user pulling the pivot arm toward a workpiece and/or caused by suddenly stopping the movement of blade 40. Typically, clamping device 144 is constructed of a relatively hard material (e.g. steel, etc.) capable of gripping the brace member without deformation. It will be appreciated that the material of clamping device 144 may vary depending on the material from which the brace member is constructed and the gripping force required to stop pivot arm 98. Optionally, the brace member may include serrations or other gripping structure to increase the grip of the clamping device on the brace member.

In the exemplary embodiment, biasing mechanism 152 is in the form of a compression spring disposed between frame 136 and distal end 154 of the clamping device. The spring is configured to move the clamping device from its nominal position to its locked position it is relatively quickly. Preferably, the spring is configured to move the clamping device to its locked position in approximately 10 milliseconds or less, more preferably in approximately 5 milliseconds or less, and most preferably 1 millisecond or less. Alternatively, the spring may be configured to move the clamping device to its locked position more slowly in applications where it is not necessary to stop the movement of operative structure 12 so quickly. Although not shown, the frame and/or the clamping device may include suitable structure to align and retain the spring in position. In alternative embodiments, biasing mechanism 152 may be a different type of spring or may take any other form adapted to urge distal end 154 upward.

As shown in FIG. 8, locking assembly 106 also includes a restraining mechanism 156 configured to maintain the clamping device in its nominal position. In the exemplary embodiment, restraining mechanism 156 takes the form of a fusible member 158 such as described above. Alternatively, the restraining member may take any other suitable form, including those described in the references incorporated herein. In any event, fusible member 158 is configured to loop around or otherwise grip the clamping device and hold it in place against the urging of biasing mechanism 152. Optionally, the fusible member may be arranged to contact an electrically insulating cover 159 disposed on clamping device 144 to insulate the clamping device from potentially high voltages present on the fusible member.

Exemplary locking assembly 106 further includes a release mechanism 160 configured to release clamping device 144 from the restraining mechanism so as to move toward its locked position. Typically, release mechanism 160 takes the form of a firing subsystem (not shown) such as described above. In response to an activation signal from control subsystem 26, the firing subsystem is adapted to supply a current to one or more contact mounts 162 that is sufficient to melt fusible member 158. In the exemplary embodiment, the fusible member is anchored to contact mount 162 so that the clamping device is released to move into its locked position when the firing subsystem supplies current to the contact mount and melts the fusible member. Alternatively, release mechanism 160 may take any of a variety of other configurations such as are described in the references incorporated herein.

As mentioned above, it may be necessary to reset or replace certain components of reaction subsystem 24 (e.g., fusible member 158, etc.) after the locking assembly is activated to clamp onto the brace member. Optionally, a portion or all of the reaction subsystem may be placed in a removable cartridge. For example, in the embodiment depicted in FIG. 8, clamping assembly 106 is mounted in a replaceable cartridge 163 adapted to slide on and off of brace member 104.

Figure 11:
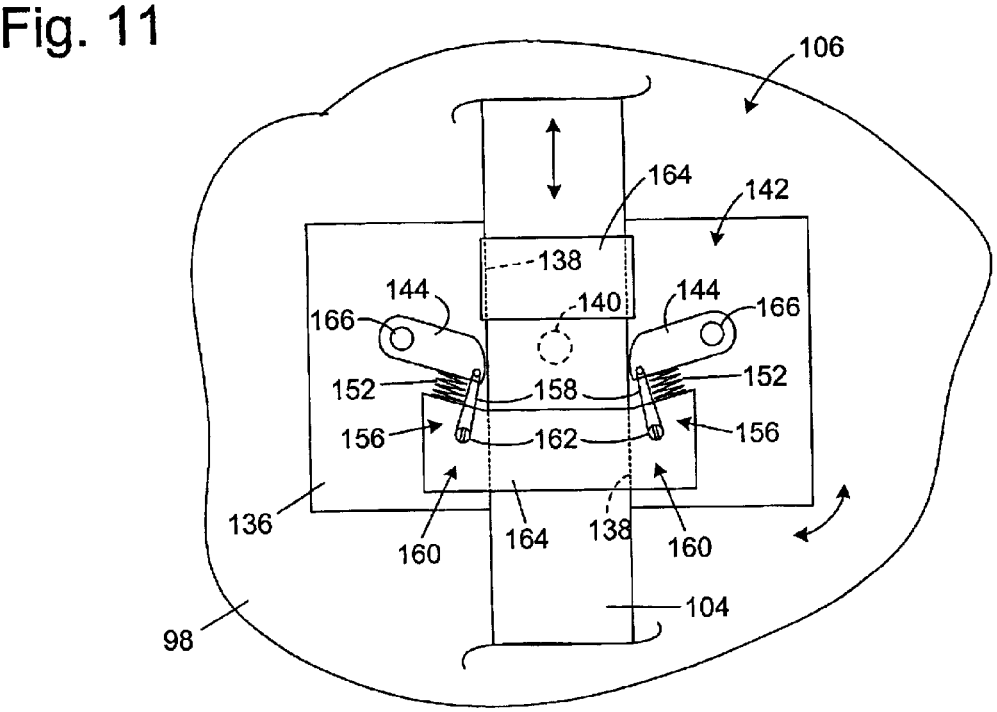
FIG. 11 is schematic, fragmentary view of an alternative exemplary reaction subsystem adapted to stop the movement of the pivot arm.

While one particular embodiment of locking assembly 106 has been described above, it will be appreciated by those of skill in the art that many other configurations are possible within the scope of the invention. One such example of an alternative locking assembly 106 is illustrated in FIG. 11. Similar to the embodiment of FIGS. 8–10, the alternative embodiment of locking assembly 106 depicted in FIG. 11 includes a frame 136 connected to pivot arm 98 by a coupling 140. The coupling is configured to allow frame 136 to move relative to the pivot arm as necessary. Frame 136 includes one or more guide structures 164 adapted to form channels 138 to slidably receive brace member 104. Guide structures 164 maintain locking assembly 106 in alignment with brace member 104 as the pivot arm is moved.

Alternative locking assembly 106 also includes a gripping mechanism 142 having a pair of clamping devices in the form of brake pawls 144 disposed on opposite sides of brace member 104. Alternatively, gripping mechanism 142 may include a single pawl or more than two pawls as needed. In any event, brake pawls 144 are pivotally coupled to frame 136 by couplings 166. The brake pawls are pivotal from cocked or unactuated positions (shown in FIG. 11) in which the brake pawls do not grip the brace member, to locked positions in which the brace member is clamped between the brake pawls.

Locking assembly 106 further includes one or more biasing mechanisms, such as springs 152, configured to urge brake pawls 144 into contact with the brace member and toward the locked positions. Similar to the embodiments described above, a restraining mechanism 156, such as fusible members 158, retains the brake pawls in the nominal positions. A release mechanism 160 is configured to melt the fusible members via contact mounts 162 in response to an activation signal received from control subsystem 26. When fusible members 158 are melted, the brake pawls are free to move into the locked position.

Once the brake pawls pivot into contact with the brace member, the brake pawls grip the brace member and are pulled into tighter clamping engagement on the brace member. Further downward pressure on frame 136 tends to increase the gripping pressure exerted on the brace member by the brake pawls. As a result, locking assembly 106 is securely clamped to the brace member when brake pawls 144 are in the locked position, thereby preventing further movement of pivot arm 98 downward toward base assembly 90. Preferably, brake pawls 144 are configured to move to the locked position and clamp the brace member within approximately 10 milliseconds, more preferably within approximately 5 milliseconds, and most preferably within approximately 1 millisecond.

Figure 12:
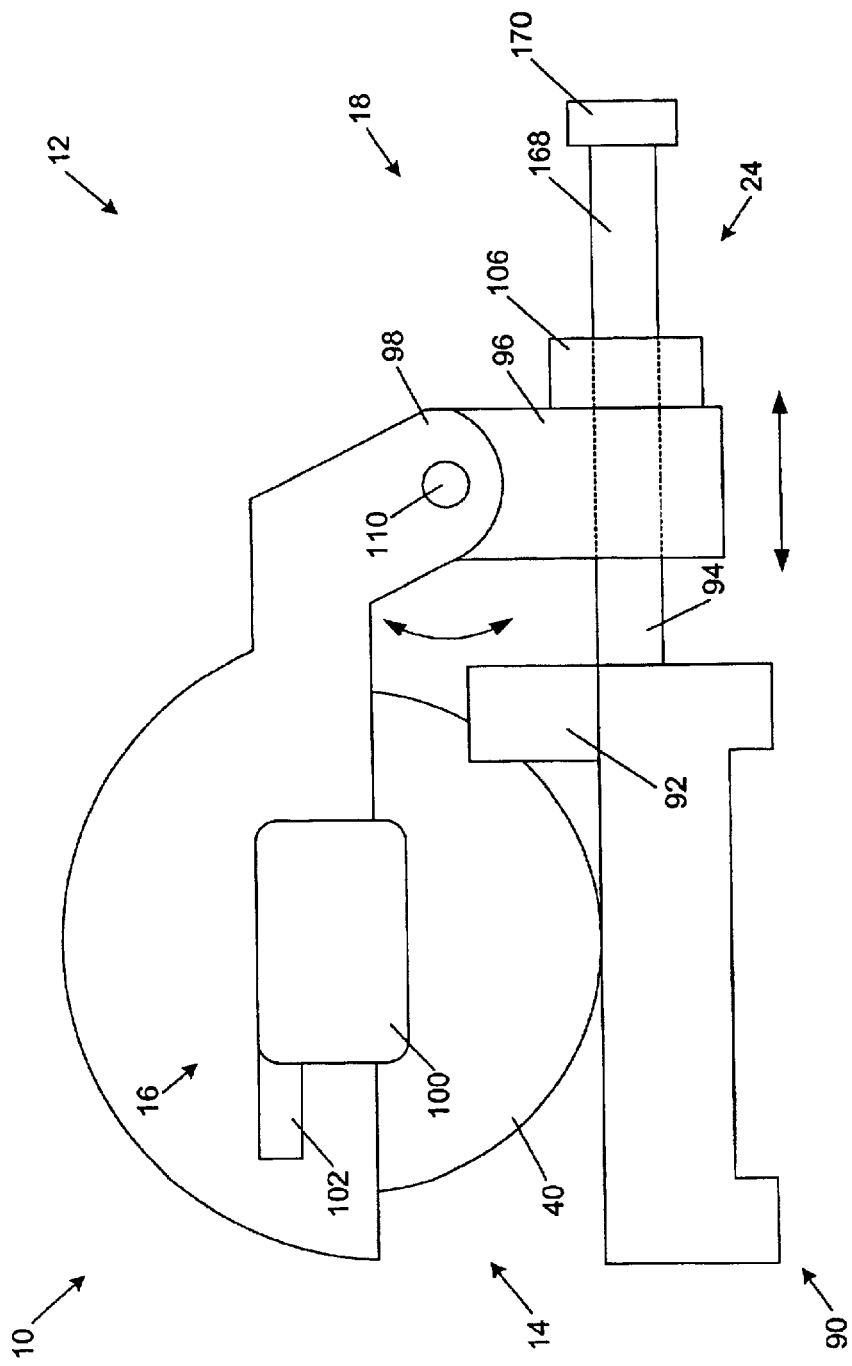
FIG. 12 is a schematic side elevation view of a sliding miter saw having an alternative exemplary safety system configured to stop the sliding movement of the miter saw pivot arm.

Turning attention now to FIG. 12, another exemplary embodiment of safety system 18 is illustrated in the context of a sliding miter saw. Platen 94 of sliding miter saw 10 includes one or more rails 168 extending backward from base assembly 90 to one or more end caps 170. Tilt mechanism 96 is configured to slide along rails 168 toward and away from the base assembly. The sliding miter saw allows an operator to cut wider workpieces by pivoting the blade into downward and then pulling or pushing the blade through the width of the workpiece. Thus, it may be desirable to stop the forward or backward sliding movement of the tilt mechanism, pivot arm and blade if the user's body contacts the blade, to prevent the blade from moving further against the user's body.

Exemplary reaction subsystem 24 includes one or more locking assemblies 106 mounted on tilt mechanism 96 to slide along rails 168. Each locking assembly is adapted to grip at least one of the rails in response to an activation signal from control subsystem 26 (not shown). It will be appreciated by those of skill in the art that the locking assemblies may take any of a variety of different forms. For example, each locking assembly may include a pivotal clamping device, such as illustrated in FIGS. 8 and 10, adapted to bind against one of the rails to prevent movement in one direction. In such case, two or more locking assemblies may be used to stop both forward and backward movement of the blade. Alternatively, each locking assembly may include two clamping devices adapted to pivot in opposite directions to prevent both forward and backward movement. As another example, each locking assembly may include one or more brake pawls, such as illustrated in FIG. 11, adapted to grip rail 168 and prevent forward and backward movement of the blade.

Figure 13:
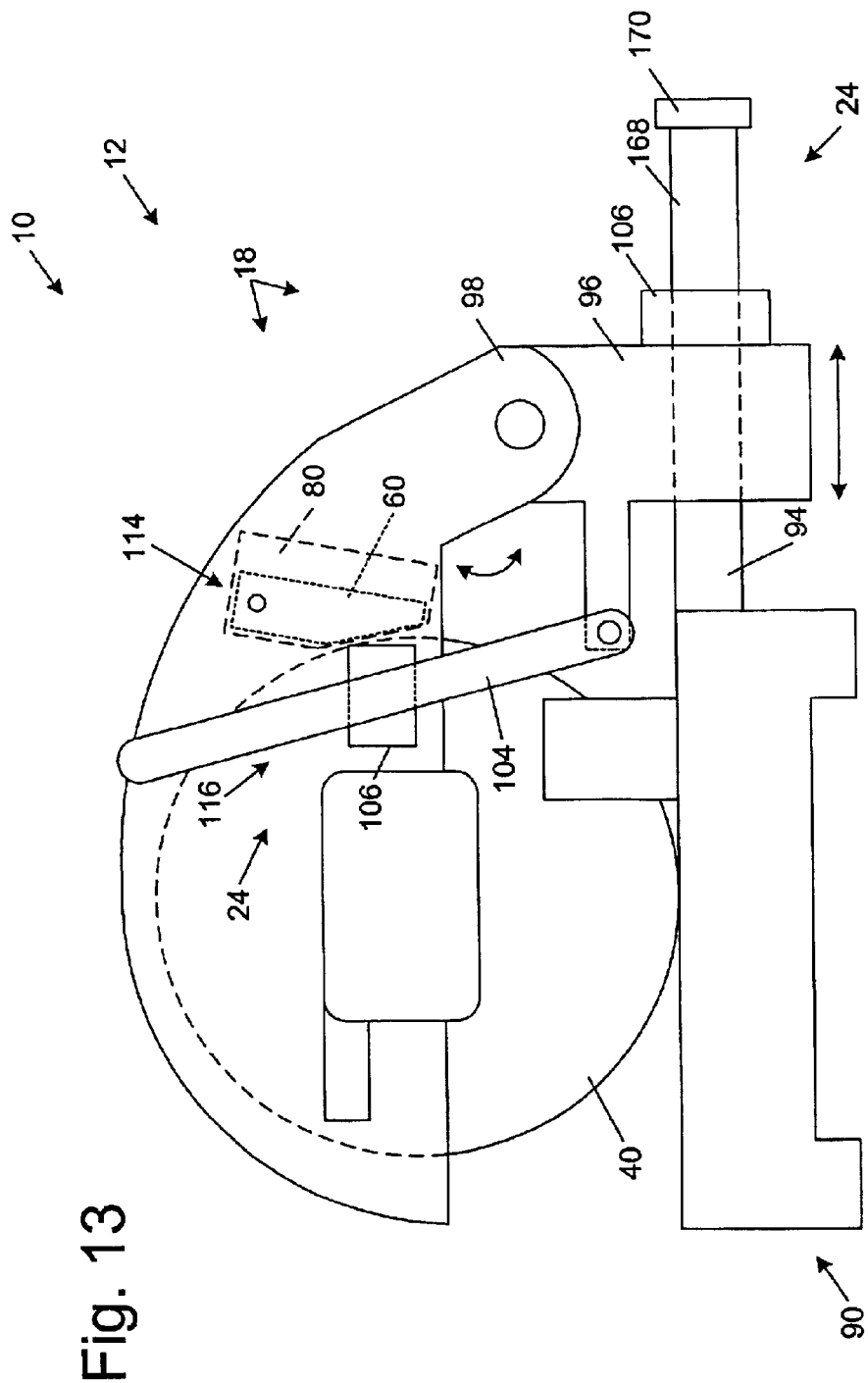
FIG. 13 is a side view of another embodiment of a sliding miter saw.

Although locking assembly 106 is disposed behind tilt mechanism 96 in the depicted embodiment, reaction subsystem 24 may alternatively include locking assemblies in front of the tilt mechanism or on both sides of the tilt mechanism. In addition, while the depicted embodiment of safety system 18 only shows stopping the sliding movement of the blade, it will be appreciated that safety system 18 would typically also be configured to stop the rotation of the blade and/or the downward movement of pivot arm 98 to provide additional protection to a user, as illustrated in FIG. 13.

As described above, the present invention provides a miter saw which is substantially safer than existing saws. The miter saw includes a safety system 18 adapted to detect the occurrence of a dangerous condition and stop the movement of the blade and/or the pivot arm to prevent serious injury to a user. Those of skill in the art will appreciate that many modifications and variations to the exemplary embodiments are possible within the scope of the invention. Furthermore, the safety system may be adapted for use on a variety of other saws in addition to miter saws. Several examples of such modifications and variations, as well as such other saws are described in more detail in the following references, the disclosures of which are herein incorporated by reference: PCT Patent Application Ser. No. PCT/US00/26812, filed Sep. 29, 2000; U.S. Provisional Patent Application Ser. No. 60/233,459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A miter saw comprising:
   a base assembly defining a cutting zone and configured to support workpieces in the cutting zone;
   a pivot arm coupled to the base assembly and selectively moveable toward and away from the cutting zone;

a tilt mechanism between the base assembly and the pivot arm, where the tilt mechanism is configured so that the pivot arm may tilt relative to the base assembly;

a motor assembly;

a rotatable arbor supported by the pivot arm and driven by the motor assembly;

a rotatable blade mounted on the arbor and configured to cut workpieces supported within the cutting zone;

a detection system configured to detect one or more dangerous conditions between a person and the blade; and a reaction system configured to stop movement of the pivot arm toward the base assembly upon detection by the detection system of the one or more dangerous conditions, where the reaction system comprises a brace member and a locking assembly; where the brace member is coupled to the tilt mechanism and the locking assembly; where the locking assembly is coupled to the pivot arm; and where the locking assembly is configured to lock onto the brace member to prevent the pivot arm from moving toward the base assembly when the detection system detects the one or more dangerous conditions between a person and the blade.

2. The miter saw of claim 1, where the reaction system further comprises a positioning mechanism associated with the brace member and locking assembly and configured to reduce any play in the brace member and locking assembly.

3. The miter saw of claim 2, where the positioning mechanism comprises a spring.

4. The miter saw of claim 1, where the brace member is slidably coupled to the locking assembly, and where the locking assembly comprises a gripping mechanism configured to selectively engage and grip the brace member.

5. The miter saw of claim 4, where the gripping mechanism comprises a clamping device; and where the locking assembly further comprises a biasing mechanism configured to urge the clamping device to a locked position, and a restraining mechanism configured to maintain the clamping device in a nominal position until the detection system detects the one or more dangerous conditions.

6. The miter saw of claim 5, where the restraining mechanism comprises a fusible member.

7. A miter saw comprising:

a base assembly defining a cutting zone and configured to support workpieces in the cutting zone;

a pivot arm coupled to the base assembly and selectively moveable toward and away from the cutting zone;

a motor assembly;

a rotatable arbor supported by the pivot arm and driven by the motor assembly;

a rotatable blade mounted on the arbor and configured to cut workpieces supported within the cutting zone;

a detection system configured to detect one or more dangerous conditions between a person and the blade; and a reaction system configured to stop movement of the pivot arm toward the base assembly upon detection by the detection system of the one or more dangerous conditions, where the reaction system comprises a brace member and a locking assembly; where the brace member is coupled to the base assembly and the locking assembly; where the locking assembly is coupled to the pivot arm; and where the locking assembly is configured to lock onto the brace member to prevent the pivot arm from moving toward the base assembly when the detection system detects the one or more dangerous conditions between a person and the blade.

8. The miter saw of claim 7, where the brace member is slidably coupled to the locking assembly, and where the locking assembly comprises a gripping mechanism configured to selectively engage and grip the brace member.

9. The miter saw of claim 8, where the gripping mechanism comprises a clamping device; and where the locking assembly further comprises a biasing mechanism configured to urge the clamping device to a locked position, and a restraining mechanism configured to maintain the clamping device in a nominal position until the detection system detects the one or more dangerous conditions.

10. The miter saw of claim 9, where the restraining mechanism comprises a fusible member.

11. A miter saw comprising:

a base assembly defining a cutting zone and configured to support workpieces in the cutting zone;

a pivot arm coupled to the base assembly and selectively moveable toward and away from the cutting zone;

a tilt mechanism between the base assembly and the pivot arm, where the tilt mechanism is configured so that the pivot arm may tilt relative to the base assembly;

a motor assembly;

a rotatable arbor supported by the pivot arm and driven by the motor assembly;

a rotatable blade mounted on the arbor and configured to cut workpieces supported within the cutting zone;

a detection system configured to detect one or more dangerous conditions between a person and the blade; and reaction means for stopping movement of the pivot arm toward the base assembly upon detection by the detection system of the one or more dangerous conditions, where the reaction means comprises a brace member and locking means for preventing the pivot arm from moving toward the base assembly when the detection system detects the one or more dangerous conditions between a person and the blade; where the brace member is coupled to the tilt mechanism and the locking means; and where the locking means is coupled to the pivot arm.

12. A miter saw comprising:

a base assembly defining a cutting zone and configured to support workpieces in the cutting zone;

a pivot arm coupled to the base assembly and selectively moveable toward and away from the cutting zone;

a motor assembly;

a rotatable arbor supported by the pivot arm and driven by the motor assembly;

a rotatable blade mounted on the arbor and configured to cut workpieces supported within the cutting zone;

a detection system configured to detect one or more dangerous conditions between a person and the blade; and reaction means for stopping movement of the pivot arm toward the base assembly upon detection by the detection system of the one or more dangerous conditions, where the reaction means comprises a brace member and locking means for preventing the pivot arm from moving toward the base assembly when the detection system detects the one or more dangerous conditions between a person and the blade; where the brace member is coupled to the base assembly and the locking means; and where the locking means is coupled to the pivot arm.

* * * * *